United States Patent
Tokieda

(10) Patent No.: US 11,965,524 B2
(45) Date of Patent: Apr. 23, 2024

(54) CENTRIFUGAL COMPRESSOR AND TURBOCHARGER

(71) Applicant: IHI Corporation, Tokyo (JP)

(72) Inventor: Katsunori Tokieda, Tokyo (JP)

(73) Assignee: IHI Corporation, Tokyo (JP)

(*) Notice: Subject to any disclaimer, the term of this patent is extended or adjusted under 35 U.S.C. 154(b) by 0 days.

(21) Appl. No.: 18/158,625

(22) Filed: Jan. 24, 2023

(65) Prior Publication Data
US 2023/0160396 A1 May 25, 2023

Related U.S. Application Data

(63) Continuation of application No. PCT/JP2021/032537, filed on Sep. 3, 2021.

(30) Foreign Application Priority Data

Dec. 9, 2020 (JP) ................ 2020-204236

(51) Int. Cl.
*F04D 29/42* (2006.01)
*F04D 17/10* (2006.01)
*F04D 29/44* (2006.01)

(52) U.S. Cl.
CPC ......... *F04D 29/4206* (2013.01); *F04D 17/10* (2013.01); *F04D 29/441* (2013.01);
(Continued)

(58) Field of Classification Search
CPC .... F04D 29/441; F04D 29/4206; F04D 17/10; F04D 29/422; F04D 29/284;
(Continued)

(56) References Cited

U.S. PATENT DOCUMENTS 11,073,164 B2 * 7/2021 Iwakiri ................... F02B 39/00
2018/0149170 A1   5/2018 Iwakiri et al.
(Continued)

FOREIGN PATENT DOCUMENTS

JP    2005-002951 A    1/2005
JP    6347457 B2    6/2018
(Continued)

OTHER PUBLICATIONS

International Search Report dated Oct. 5, 2021 in PCT/JP2021/032537 filed Sep. 3, 2021 (with English Translation), 4 pages.

*Primary Examiner* — Eric J Zamora Alvarez
(74) *Attorney, Agent, or Firm* — Oblon, McClelland, Maier & Neustadt, L.L.P.

(57) ABSTRACT

A centrifugal compressor includes: a housing accommodating an impeller; a diffuser flow path formed radially outside the impeller in the housing; and a scroll flow path formed in the housing and connected to the diffuser flow path from a radially-outer side, the scroll flow path extending in a rotational axis direction and a rotational direction of the impeller with respect to the diffuser flow path, the scroll flow path including a radially-inner end located at the radially-innermost position, and the radially-inner end being spaced apart from the diffuser flow path with respect to a middle point of the maximum flow path width of the scroll flow path in the rotational axis direction.

4 Claims, 5 Drawing Sheets

(52) U.S. Cl.
CPC ...... *F05D 2220/40* (2013.01); *F05D 2240/12* (2013.01); *F05D 2240/14* (2013.01)

(58) Field of Classification Search
CPC .... F04D 29/667; F04D 29/681; F04D 29/403; F04D 29/44; F04D 29/4213; F04D 29/442; F04D 29/282; F04D 29/4233; F04D 29/464; F05D 2250/52; F05D 2220/40; F05D 2240/12; F05D 2240/14; F05D 2250/70; F05D 2250/50; F01D 25/24; Y02T 10/12
See application file for complete search history.

(56) References Cited

U.S. PATENT DOCUMENTS

| | | |
|---|---|---|
| 2018/0355886 A1* | 12/2018 | Fujiwara ................ F04D 17/10 |
| 2019/0055959 A1 | 2/2019 | Iwakiri et al. |
| 2020/0173460 A1 | 6/2020 | Ueno et al. |
| 2020/0217329 A1 | 7/2020 | Iwakiri |

FOREIGN PATENT DOCUMENTS

| | | |
|---|---|---|
| JP | 6642711 B2 | 2/2020 |
| WO | WO 2017/168650 A1 | 10/2017 |
| WO | WO 2018/179112 A1 | 10/2018 |

\* cited by examiner

CENTRIFUGAL COMPRESSOR AND TURBOCHARGER

CROSS REFERENCE TO RELATED APPLICATIONS

This application is a continuation application of International Application No. PCT/JP2021/032537, filed on Sep. 3, 2021, which claims priority to Japanese Patent Application No. 2020-204236 filed on Dec. 9, 2020, the entire contents of which are incorporated herein by reference.

BACKGROUND ART

Technical Field

The present disclosure relates to a centrifugal compressor and a turbocharger.

Patent Literature 1 discloses a centrifugal compressor comprising a compressor housing and a compressor impeller. A diffuser flow path and a scroll flow path are formed in the compressor housing of Patent Literature 1. A radially-inner end located at the radially-innermost position is formed in the scroll flow path. The radially-inner end of the scroll flow path is located on a side closer to the diffuser flow path with respect to the middle point of the maximum flow path width in the rotational axis direction of the compressor impeller.

CITATION LIST

Patent Literature

Patent Literature 1: JP 6347457 B

SUMMARY

Technical Problem

When the radially-inner end of the scroll flow path is located on the side closer to the diffuser flow path, a cross-sectional shape of a radially-inner side of the scroll flow path has a large curvature. This causes a large change in a flow direction along the scroll flow path wall, and air is likely to separate from an inner surface of the scroll flow path on the inner side closer to the diffuser flow path.

The purpose of the present disclosure is to provide a centrifugal compressor and a turbocharger than can curb air separation in the scroll flow path.

Solution to Problem

To solve the above problem, a centrifugal compressor of the present disclosure includes: a housing accommodating an impeller; a diffuser flow path formed radially outside the impeller in the housing; and a scroll flow path formed in the housing and connected to the diffuser flow path from a radially-outer side, the scroll flow path extending in a rotational axis direction and a rotational direction of the impeller with respect to the diffuser flow path, the scroll flow path including a radially-inner end located at the radially-innermost position, and the radially-inner end being spaced apart from the diffuser flow path with respect to a middle point of the maximum flow path width of the scroll flow path in the rotational axis direction.

The scroll flow path may include an radially-inner surface located on a radially-inner side, the radially-inner surface may include a first curvature surface closer to the diffuser flow path with respect to the radially-inner end and a second curvature surface spaced apart from the diffuser flow path with respect to the radially-inner end, and a radius of curvature of the first curvature surface may be equal to a radius of curvature of the second curvature surface.

A separation distance in the rotational axis direction between the middle point and the radially-inner end may be larger in an intermediate section than those at a tongue and an end of winding of the scroll flow path, the intermediate section being located between the tongue and the end of winding in a direction of extension of the scroll flow path.

The scroll flow path may include an radially-inner surface located on a radially-inner side, the radially-inner surface may include a first curvature surface closer to the diffuser flow path with respect to the radially-inner end and a second curvature surface spaced apart from the diffuser flow path with respect to the radially-inner end, and a radius of curvature of the first curvature surface may be larger than a radius of curvature of the second curvature surface in the intermediate section.

To solve the above problem, a turbocharger of the present disclosure includes the centrifugal compressor described above.

Effects of Disclosure

According to the present disclosure, flow separation along a scroll flow path wall can be curbed.

DESCRIPTION OF EMBODIMENTS

An embodiment of the present disclosure will be described in detail below with reference to the accompanying drawings. Specific dimensions, materials, and numerical values described in the embodiment are merely examples for a better understanding, and do not limit the present disclosure unless otherwise specified. In this specification and the drawings, duplicate explanations are omitted for elements having substantially the same functions and configurations by assigning the same reference sign. Furthermore, elements not directly related to the present disclosure are omitted from the figures.

Figure 1:
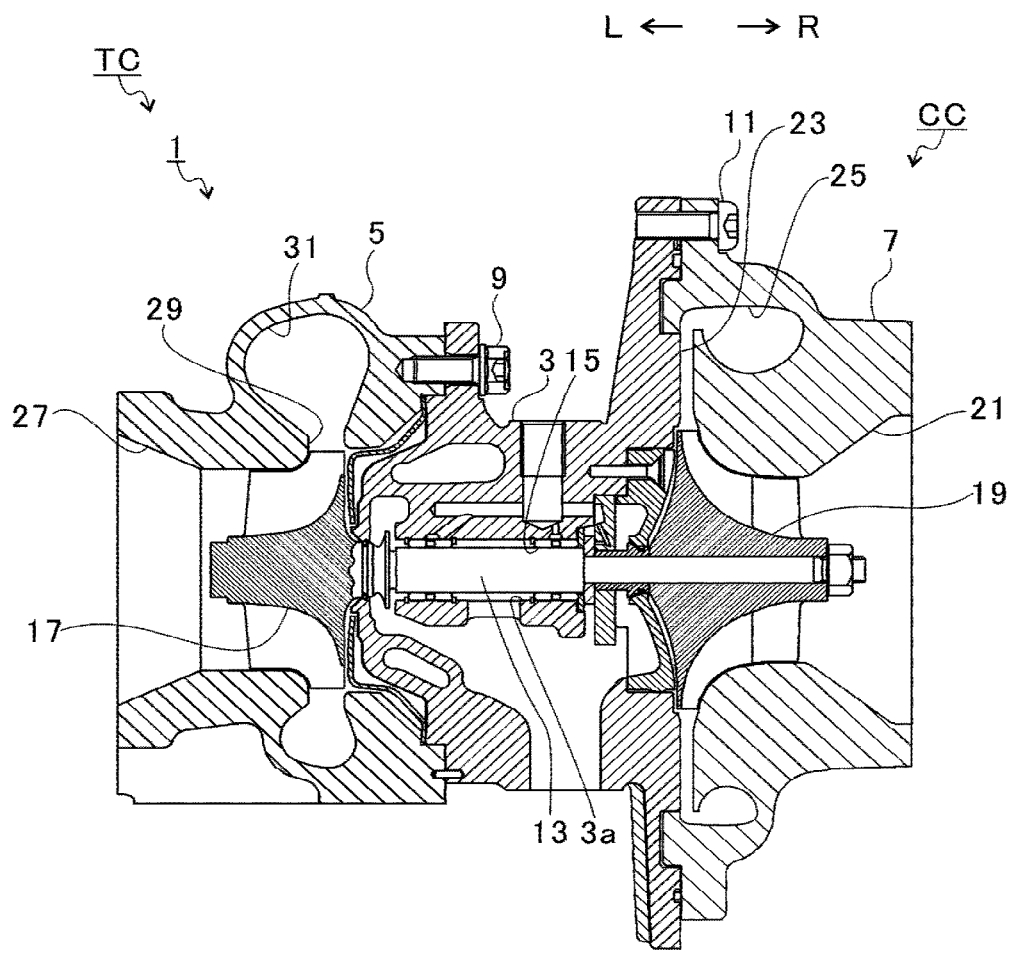
FIG. 1 is a schematic cross-sectional view of a turbocharger.

FIG. 1 is a schematic cross-sectional view of a turbocharger TC. Hereinafter, a direction indicated by an arrow L in FIG. 1 is described as the left side of the turbocharger TC. A direction indicated by an allow R in FIG. 1 is described as the right side of the turbocharger TC. As shown in FIG. 1, the turbocharger TC comprises a turbocharger body 1. The turbocharger body 1 includes a bearing housing 3, a turbine housing 5, and a compressor housing (housing) 7. The turbine housing 5 is connected to the left side of the bearing housing 3 by a fastening bolt 9. The compressor housing 7 is connected to the right side of the bearing housing 3 by a fastening bolt 11.

A bearing hole 3a is formed in the bearing housing 3. The bearing hole 3a passes through the bearing housing 3 in the left-to-right direction of the turbocharger TC. The bearing hole 3a accommodates a portion of a shaft 13. The bearing hole 3a accommodates a bearing 15. In this embodiment, the bearing 15 is a full floating bearing. However, the bearing 15 is not limited thereto, and may be any other bearing such as a semi-floating bearing or a rolling bearing. The shaft 13 is rotatably supported by the bearing 15. The left end of the shaft 13 is provided with a turbine wheel 17. The turbine wheel 17 is rotatably housed in the turbine housing 5. A compressor impeller (impeller) 19 is provided at the right end of the shaft 13. The compressor impeller 19 is rotatably housed in the compressor housing 7. In the present disclosure, a rotational axis direction, a radial direction, and a rotational direction of the shaft 13, the turbine wheel 17, and the compressor impeller 19 may simply be referred to as the rotational axis direction, the radial direction, and the rotational direction, respectively.

An inlet 21 is formed in the compressor housing 7. The inlet 21 opens to the right side of the turbocharger TC. The inlet 21 is connected to an air cleaner (not shown). A diffuser flow path 23 is formed by opposing surfaces of the bearing housing 3 and the compressor housing 7. The diffuser flow path 23 is formed in an annular shape. The diffuser flow path 23 is formed radially outside the compressor impeller 19 in the compressor housing 7. The diffuser flow path 23 is connected to the inlet 21 via the compressor impeller 19 at a radially-inner part. Air flowing from the inlet 21 flows in the diffuser flow path 23 through the compressor impeller 19. The diffuser flow path 23 pressurizes the air.

A compressor scroll flow path (scroll flow path) 25 is formed in the compressor housing 7. The compressor scroll flow path 25 is formed in an annular shape. For example, the compressor scroll flow path 25 is located radially outside the diffuser flow path 23. The compressor scroll flow path 25 is connected to a radially outer part of the diffuser flow path 23. The compressor scroll flow path 25 extends in the rotational axis direction and the rotational direction with respect to the diffuser flow path 23. The compressor scroll flow path 25 is connected to an intake port of an engine (not shown) and the diffuser flow path 23. When the compressor impeller 19 rotates, air is sucked into the compressor housing 7 from the inlet 21. The sucked air is pressurized and accelerated while flowing through blades of the compressor impeller 19. The pressurized and accelerated air is pressurized in the diffuser flow path 23 and the compressor scroll flow path 25. The pressurized air is directed to the intake port of the engine.

A centrifugal compressor CC comprises the above-described compressor housing 7 and the bearing housing 3. In this embodiment, an example in which the centrifugal compressor CC is mounted in the turbocharger TC is described. However, the centrifugal compressor CC is not limited thereto, and may be incorporated into a device other than the turbocharger TC, or may be a stand-alone unit.

An outlet 27 is formed in the turbine housing 5. The outlet 27 opens to the left side of the turbocharger TC. The outlet 27 is connected to an exhaust gas purifier (not shown). A connecting flow path 29 and a turbine scroll flow path 31 are formed in the turbine housing 5. The connecting flow path 29 is located radially outside the turbine wheel 17. The connecting flow path 29 is formed in an annular shape. The connecting flow path 29 connects the outlet 27 to the turbine scroll flow path 31 through the turbine wheel 17.

For example, the turbine scroll flow path 31 is located radially outside the connecting flow path 29. The turbine scroll flow path 31 is formed in an annular shape. The turbine scroll flow path 31 is connected to a gas inlet (not shown). Exhaust gas discharged from an exhaust manifold of the engine (not shown) is directed to the gas inlet. The exhaust gas passes through the turbine scroll flow path 31 and the connecting flow path 29, and is directed to the outlet 27 through the turbine wheel 17. The exhaust gas rotates the turbine wheel 17 while flowing through the turbine wheel 17.

The rotational force of the turbine wheel 17 is transmitted to the compressor impeller 19 via the shaft 13. As the compressor impeller 19 rotates, air is pressurized as described above. As such, the air is directed to the intake port of the engine.

Figure 2:
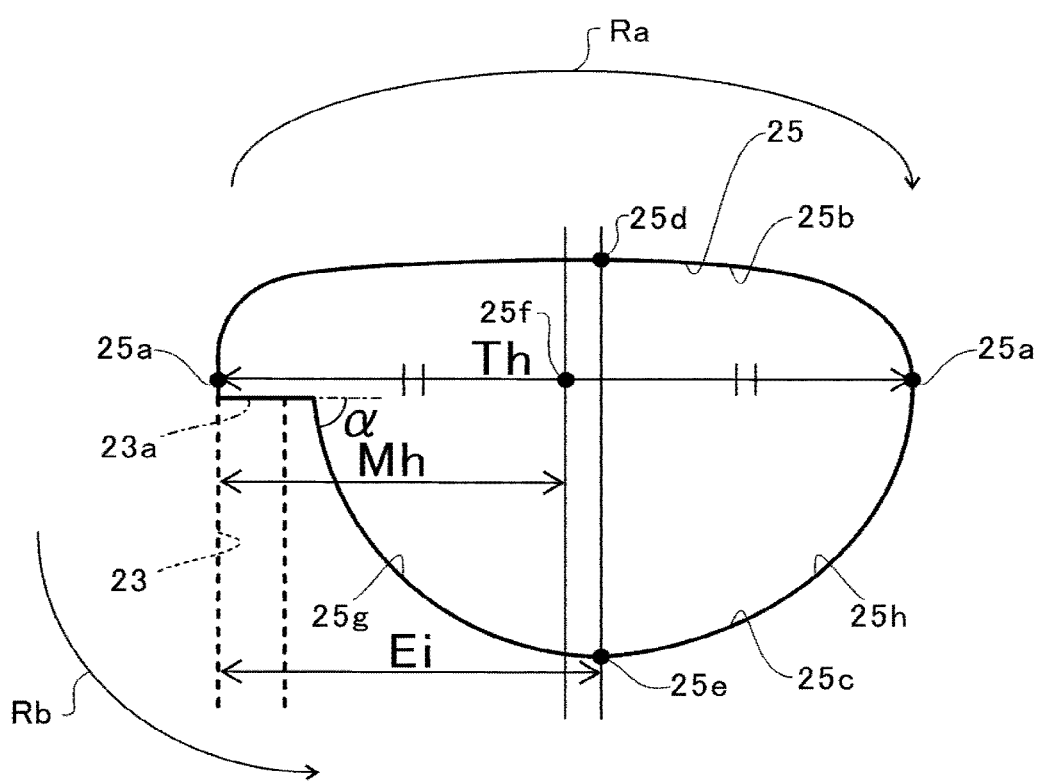
FIG. 2 is a schematic cross-sectional view of a compressor scroll flow path of an embodiment.

FIG. 2 is a schematic cross-sectional view of the compressor scroll flow path 25 of the embodiment. As shown in FIG. 2, the compressor scroll flow path 25 includes lateral ends 25a and 25a that define the maximum flow path width Th in the rotational axis direction. An inner surface of the compressor scroll flow path 25 includes a radially-outer surface 25b and a radially-inner surface 25c across the lateral ends 25a and 25a.

The radially-outer surface 25b is formed radially outside the lateral ends 25a and 25a in the inner surface of the compressor scroll flow path 25. The radially-outer surface 25b has a curved-surface shape protruding radially outward. The radially-inner surface 25c is formed radially inside the lateral ends 25a and 25a in the inner surface of the compressor scroll flow path 25. The radially-inner surface 25c has a curved-surface shape protruding radially inward.

Most of the air flowing from the diffuser flow path 23 into the compressor scroll flow path 25 is guided along the radially-outer surface 25b from a portion proximate to the diffuser flow path 23 to a portion spaced apart from the diffuser flow path 23. The air moving along the radially-outer surface 25b is guided from the radially-outer surface 25b to the radially-inner surface 25c, and then guided along the radially-inner surface 25c from a portion spaced apart from the diffuser flow path 23 to a portion proximate to the diffuser flow path 23. As such, most of the air flowing from the diffuser flow path 23 into the compressor scroll flow path 25 forms a clockwise swirling flow in FIG. 2 (in a direction indicated by an arrow Ra in the figure) in the compressor scroll flow path 25.

Furthermore, a portion of the air flowing from the diffuser flow path 23 into the compressor scroll flow path 25 moves from an exit end surface 23a of the diffuser flow path 23 to the right side in FIG. 2, and is guided along the radially-inner surface 25c from the portion proximate to the diffuser flow path 23 to the portion spaced apart from the diffuse flow path 23. As such, a portion of the air flowing from the diffuser flow path 23 into the compressor scroll flow path 25 forms a counterclockwise swirling flow (in a direction indicated by an arrow Rb in the figure) in the compressor scroll flow path 25 in FIG. 2.

The clockwise swirling flow and the counterclockwise swirling flow in the compressor scroll flow path 25 in FIG. 2 collide with each other at a first curvature surface 25g (described later) in the radially-inner surface 25c, and form a stagnation area (separation area).

The radially-outer surface 25b includes a radially-outer end 25d that is located radially-outermost position in the compressor scroll flow path 25. The radially-inner surface 25c includes a radially-inner end 25e that is located radially-innermost position in the compressor scroll flow path 25.

In the radial direction, a distance from the lateral ends 25a and 25a to the radially-outer end 25d is shorter than a distance from the lateral ends 25a and 25a to the radially-inner end 25e. A cross-sectional area of the flow path 25 on a radially-outer side with respect to the lateral ends 25a and 25a is smaller than a cross-sectional area of the flow path 25 on a radially-inner side with respect to the lateral ends 25a and 25a.

The radially-outer end 25d is in the same position as the radially-inner end 25e in the rotational axis direction. However, the radially-outer end 25d is not limited thereto, and may be at a different position from the radially-inner end 25e in the rotational axis direction. The radially-outer end 25d is spaced apart from the diffuser flow path 23 with respect to a middle point 25f of the maximum flow path width Th in the rotational axis direction.

The radially-inner end 25e is spaced apart from the diffuser flow path 23 with respect to the middle point 25f of the maximum flow path width Th in the rotational axis direction. A width Ei between the lateral end 25a closer to the diffuser flow path 23 and the radially-inner end 25e is larger than a width Mh between the lateral end 25a closer to the diffuser flow path 23 and the middle point 25f. In other words, a separation distance in the rotational axis direction between the lateral end 25a closer to the diffuser flow path 23 and the radially-inner end 25e is larger than a separation distance in the rotational axis direction between the lateral end 25a closer to the diffuser flow path 23 and the middle point 25f. The radially-inner end 25e is located between the lateral end 25a spaced apart from the diffuser flow path 23 and the middle point 25f in the rotational axis direction. The radially-inner end 25e is closer to the middle point 25f with respect to the lateral end 25a spaced apart from the diffuser flow path 23.

The radially-inner surface 25c includes the first curvature surface 25g and a second curvature surface 25h. The first curvature surface 25g is closer to the diffuser flow path 23 with respect to the radially-inner end 25e of the radially-inner surface 25c. The second curvature surface 25h is spaced apart from the diffuser flow path 23 with respect to the radially-inner end 25e of the radially-inner surface 25c. A radius of curvature of the first curvature surface 25g is equal to a radius of curvature of the second curvature surface 25h. In the present disclosure, "equal" means including a case where they are completely equal to each other, and a case where they are substantially equal to each other with a manufacturing tolerance or an error. However, the radius of curvature of the first curvature surface 25g is not limited thereto, and may be different from the radius of curvature of the second curvature surface 25h.

As mentioned above, in the compressor scroll flow path 25 of this embodiment, a height of the radially-outer side (distance to the radially-outer end 25d in the radial direction) is smaller than a height of the radially-inner side (distance to the radially-inner end 25e in the radial direction), with respect to the lateral ends 25a and 25a defining the maximum flow path width Th. Accordingly, the maximum outer diameter of the compressor scroll flow path 25 can be reduced compared to a case where the height of the radially-outer side and the height of the radially-inner side with respect to the lateral ends 25a and 25a are equal to each other. As a result, the maximum outer diameter of the compressor housing 7 can be reduced.

Meanwhile, the compressor scroll flow path 25 of this embodiment has a larger height on the radially-inner side and has a shape protruding radially more inwardly, compared to the case where the height on the radially-outer side and the height on the radially-inner side with respect to the lateral ends 25a and 25a are equal to each other. As the height of the radially-inner side of the compressor scroll flow path 25 increases, the curvature of the cross-sectional shape of the flow path on the radially-inner side increases. Accordingly, the air flowing from the diffuser flow path 23 into the compressor scroll flow path 25 is likely to separate especially at the first curvature surface 25g, and the separation area is likely to expand. As the separation area expands, the performance of the centrifugal compressor CC decreases.

As the radially-inner end 25e of the compressor scroll flow path 25 approaches the diffuser flow path 23 with respect to the middle point 25f, an angle α between the exit end surface 23a of the diffuser flow path 23 and the first curvature surface 25g increases. As the angle α increases, the air flowing from the diffuser flow path 23 into the compressor scroll flow path 25 is likely to separate from the first curvature surface 25g.

Accordingly, in this embodiment, the radially-inner end 25e of the compressor scroll flow path 25 is arranged to be spaced apart from the diffuser flow path 23 with respect to the middle point 25f. This allows the angle α between the exit end surface 23a of the diffuser flow path 23 and the first curvature surface 25g to be smaller compared to a case where the radially-inner end 25e is located closer to the diffuser flow path 23 with respect to the middle point 25f. As a result, the air flowing from the diffuser flow path 23 into the compressor scroll flow path 25 is less likely to separate from the first curvature surface 25g, and the expansion of the separation area can be curbed.

Furthermore, when the radii of curvature of the first curvature surface 25g and the second curvature surface 25h are equal to each other, the air flowing from the diffuser flow path 23 into the compressor scroll flow path 25 can move smoothly on the first curvature surface 25g and the second curvature surface 25h. As a result, the air is less likely to separate from the first curvature surface 25g and the second curvature surface 25h, and the expansion of the separation area can be curbed.

Figure 3:
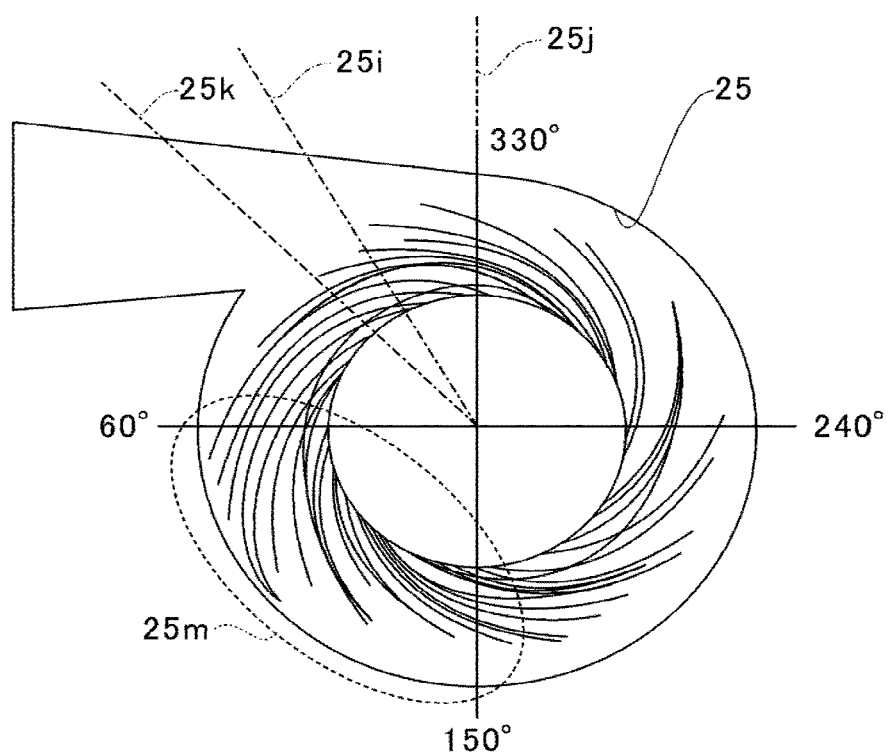
FIG. 3 is a view visualizing velocity of air flowing in the compressor scroll flow path.
Figure 4:
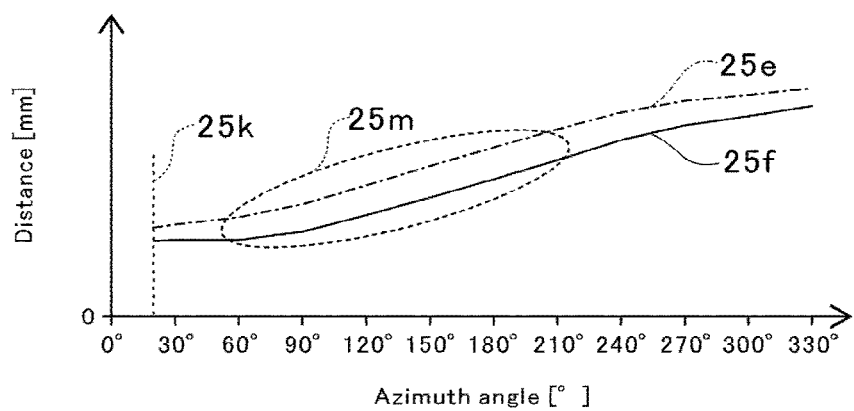
FIG. 4 is a graph indicating a relationship between an azimuth angle from the beginning to the end of winding of the compressor scroll flow path and a distance between a radially-inner end and a middle point in the rotational axis direction.

FIG. 3 is a view visualizing velocity of air flowing in the compressor scroll flow path 25. FIG. 4 is a graph indicating a relationship between an azimuth angle from the beginning to the end of winding of the compressor scroll flow path 25 and a distance between a radially-inner end 25e and the middle point 25f in the rotational axis direction. In FIG. 3, multiple curves shown in the compressor scroll flow path 25 indicate magnitude of air velocity, with longer curves indicating higher velocity. In FIG. 4, the vertical axis indicates a distance in the rotational axis direction with respect to the lateral end 25a closer to the diffuser flow path 23, and the horizontal axis indicates the azimuth angle from the beginning to the end of winding of the compressor scroll flow path 25.

As shown in FIGS. 3 and 4, the beginning 25i of winding of the compressor scroll flow path 25 is represented by an azimuth angle of 0°, and the end 25j of winding by an azimuth angle of 330°. The compressor scroll flow path 25 also includes a tongue 25k that divides a upstream portion and a downstream portion of the compressor scroll flow path 25. The tongue 25k of the compressor scroll flow path 25 is represented by an approximate azimuth angle of 15°. The compressor scroll flow path 25 includes an intermediate section 25m between the beginning 25i (tongue 25k) and the end 25j of winding in the direction of extension of the compressor scroll flow path 25. The intermediate section 25m has a range represented, for example, by an azimuth angle of 60° to 210°, as shown in FIG. 4. However, the range (azimuth angle) of the intermediate section 25m is not limited thereto.

As shown in FIG. 4, a separation distance in the rotational axis direction between the middle point 25f and the radially-inner end 25e varies along the direction of extension (azimuth angle) of the compressor scroll flow path 25. The separation distance in the rotational axis direction between the middle point 25f and the radially-inner end 25e is smallest at the tongue 25k.

The separation distance in the rotational axis direction between the middle point 25f and the radially-inner end 25e gradually increases from the tongue 25k to the intermediate section 25m and gradually decreases from the intermediate section 25m to the end 25j of winding. In other words, the separation distance in the rotational axis direction between the middle point 25f and the radially-inner end 25e is larger in the intermediate section 25m than those at the beginning 25i (tongue 25k) and the end 25j of winding of the compressor scroll flow path 25.

Figure 5:
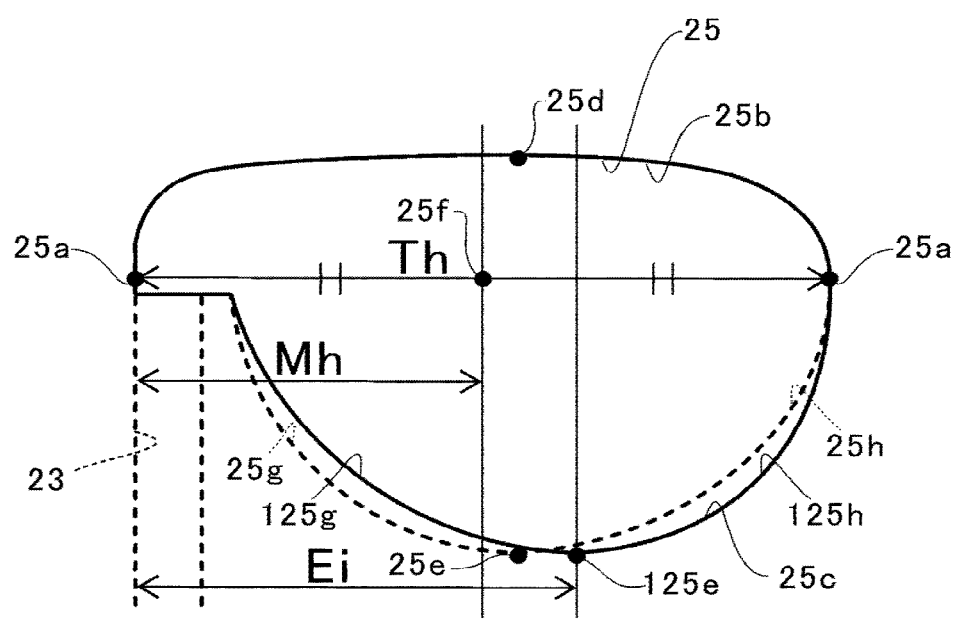
FIG. 5 is a schematic cross-sectional view of the compressor scroll flow path in an intermediate section.

FIG. 5 is a schematic cross-sectional view of the compressor scroll flow path 25 in the intermediate section 25m. In FIG. 5, the cross-sectional shape of the flow path at the end 25j of winding is shown as a dashed line, and the cross-sectional shape of the flow path in the intermediate section 25m is shown as a solid line. The cross-sectional shape of the flow path at the end 25j of winding is the same as the cross-sectional shape of the flow path shown in FIG. 2.

As shown in FIG. 5, the radially-inner end 125e of the compressor scroll flow path 25 in the intermediate section 25m is more spaced apart from the diffuser flow path 23 compared to the radially-inner end 25e of the compressor scroll flow path 25 at the end 25j of winding. In other words, the separation distance in the rotational axis direction between the middle point 25f and the radially-inner end 125e in the intermediate section 25m is larger than the separation distance in the rotational axis direction between the middle point 25f and the radially-inner end 25e in the end 25j of winding.

Accordingly, the first curvature surface 125g of the compressor scroll flow path 25 in the intermediate section 25m has a larger radius of curvature than that of the first curvature surface 25g of the compressor scroll flow path 25 at the end 25j of winding.

The second curvature surface 125h of the compressor scroll flow path 25 in the intermediate section 25m has a smaller radius of curvature than that of the second curvature surface 25h of the compressor scroll flow path 25 at the end 25j of winding. As a result, the radius of curvature of the first curvature surface 125g is larger than the radius of curvature of the second curvature surface 125h. In other words, the radius of curvature of the second curvature surface 125h is smaller than the radius of curvature of the first curvature surface 125g.

As shown in FIG. 3, the plurality of curves shown in the compressor scroll flow path 25 extend longer to the vicinity of the radially-outer end of the compressor scroll flow path 25 in the intermediate section 25m (especially in azimuth angles of 60° to 150°). As such, the velocity of the air flowing in the compressor scroll flow path 25 is highest in the intermediate section 25m (especially in azimuth angles of 60° to 150°). As the velocity of the air increases, the air is likely to separate from the first curvature surfaces 25g and 125g.

Accordingly, in this embodiment, the radius of curvature of the second curvature surface 125h is reduced in the intermediate section 25m where the velocity of the air is the largest. By reducing the radius of curvature, the clockwise air swirling velocity in FIG. 5 can be reduced more efficiently compared to a case where the radius of curvature is larger. This reduces the air moving from the second curvature surface 125h to the first curvature surface 125g separating from the first curvature surface 125g, and the expansion of the separation area can be curbed.

Although the embodiment of the present disclosure has been described above with reference to the accompanying drawings, the present disclosure is not limited thereto. It is obvious that a person skilled in the art can conceive of various examples of variations or modifications within the scope of the claims, which are also understood to belong to the technical scope of the present disclosure.

The above embodiment describes an example in which the separation distance in the rotational axis direction between the middle point 25f and the radially-inner end 25e varies along the direction of extension of the compressor scroll flow path 25. However, the separation distance in the rotational axis direction between the middle point 25f and the radially-inner end 25e is not limited thereto, and may be constant along the direction of extension of the compressor scroll flow path 25.

What is claimed is:

1. A centrifugal compressor comprising:
   a housing accommodating an impeller;
   a diffuser flow path formed radially outside the impeller in the housing; and
   a scroll flow path formed in the housing and connected to the diffuser flow path from a radially-outer side, the scroll flow path extending in a rotational axis direction and a rotational direction of the impeller with respect to the diffuser flow path, the scroll flow path including a radially-inner end located at a radially-innermost position, and the radially-inner end being spaced apart from the diffuser flow path with respect to a middle point of a maximum flow path width of the scroll flow path in the rotational axis direction,
   wherein a separation distance in the rotational axis direction between the middle point and the radially-inner end is larger in an intermediate section than those at a tongue and at an end of winding of the scroll flow path, the intermediate section being located between the tongue and the end of winding in a direction of extension of the scroll flow path.

2. The centrifugal compressor according to claim 1, wherein the scroll flow path includes a radially-inner surface located on a radially-inner side, the radially-inner surface includes a first curvature surface closer to the diffuser flow path with respect to the radially-inner end and a second curvature surface spaced apart from the diffuser flow path with respect to the radially-inner end, and a radius of curvature of the first curvature surface is equal to a radius of curvature of the second curvature surface.

3. The centrifugal compressor according to claim 1, wherein the scroll flow path includes a radially-inner surface located on a radially-inner side, the radially-inner surface includes a first curvature surface closer to the diffuser flow path with respect to the radially-inner end and a second curvature surface spaced apart from the diffuser flow path with respect to the radially-inner end, and, in the intermediate section, a radius of curvature of the first curvature surface is larger than a radius of curvature of the second curvature surface.

4. A turbocharger comprising the centrifugal compressor according to claim 1.

* * * * *